(12) United States Patent
Dowdy

(10) Patent No.: US 12,311,722 B2
(45) Date of Patent: May 27, 2025

(54) SYSTEMS AND METHODS FOR A SUSPENSION ASSEMBLY ON AN ELECTRIFIED VEHICLE

(71) Applicant: Oshkosh Corporation, Oshkosh, WI (US)

(72) Inventor: Austin Dowdy, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 18/371,311

(22) Filed: Sep. 21, 2023

(65) Prior Publication Data
US 2024/0100897 A1 Mar. 28, 2024

Related U.S. Application Data

(60) Provisional application No. 63/408,903, filed on Sep. 22, 2022.

(51) Int. Cl.
*B60G 9/00* (2006.01)
*B60G 9/02* (2006.01)
*B60G 13/00* (2006.01)

(52) U.S. Cl.
CPC .............. *B60G 9/003* (2013.01); *B60G 9/00* (2013.01); *B60G 9/02* (2013.01); *B60G 13/005* (2013.01); *B60G 2200/314* (2013.01); *B60G 2200/422* (2013.01); *B60G 2204/143* (2013.01); *B60G 2204/43* (2013.01); *B60G 2204/4302* (2013.01); *B60G 2300/0262* (2013.01); *B60G 2300/50* (2013.01)

(58) Field of Classification Search
CPC . B60G 9/003; B60G 9/00; B60G 9/02; B60G 13/005; B60G 13/001; B60G 13/00; B60G 2200/314; B60G 2200/422; B60G 2200/318; B60G 2204/43; B60G 2204/4302; B60G 2204/19; B60G 2204/143; B60G 2300/50; B60G 2300/02; B60G 2300/022; B60G 2300/026; B60G 2300/03; B60G 2300/0262; B60G 5/02; B60G 5/00; B60G 5/04; B60K 17/36
USPC .......... 280/124.1, 124.116, 124.11, 124.156, 280/677; 180/352, 378, 24.01, 349
See application file for complete search history.

(56) References Cited

U.S. PATENT DOCUMENTS 2,356,180 A * 8/1944 Roos ...................... B60G 5/053
280/124.17
4,687,222 A * 8/1987 Chalmers ............... B60G 11/30
280/683

(Continued)

*Primary Examiner* — Keith J Frisby
(74) *Attorney, Agent, or Firm* — FOLEY & LARDNER LLP

(57) ABSTRACT

A suspension assembly includes a first linkage rod coupled between an axle housing and a first frame rail, and a second linkage rod coupled between the axle housing and a second frame rail. The first linkage rod is arranged at an angle relative to a central longitudinal axis so that as the first linkage rod extends from the axle housing toward the first frame rail, the first linkage rod angles laterally outwardly and away from the central longitudinal axis. The second linkage rod is arranged at an angle relative to the central longitudinal axis so that as the second linkage rod extends from the axle housing toward the second frame rail, the second linkage rod angles laterally outwardly and away from the central longitudinal axis.

20 Claims, 13 Drawing Sheets

(56) References Cited

U.S. PATENT DOCUMENTS

| | | | | |
|---|---|---|---|---|
| 6,439,588 | B1* | 8/2002 | Svensson | B60G 11/20 |
| | | | | 248/225.11 |
| 6,607,206 | B2* | 8/2003 | Petit | B60G 7/04 |
| | | | | 267/192 |
| 9,180,735 | B2* | 11/2015 | Tipton | B62D 21/14 |
| 2021/0162873 | A1* | 6/2021 | Yu | B60L 50/70 |
| 2022/0194153 | A1 | 6/2022 | Dowdy et al. | |

\* cited by examiner

SYSTEMS AND METHODS FOR A SUSPENSION ASSEMBLY ON AN ELECTRIFIED VEHICLE

CROSS-REFERENCE TO RELATED PATENT APPLICATIONS

This application claims the benefit of and priority to U.S. Provisional Application No. 63/408,903, filed on Sep. 22, 2022, the entire disclosure of which is hereby incorporated by reference herein.

BACKGROUND

Vehicles typically include a suspension coupled between a chassis and one or more tractive elements (e.g., wheels, tracks, etc.) to absorb and/or dampen road forces acting on the tractive elements.

SUMMARY

At least one embodiment relates to a suspension assembly for an electrified vehicle. The electrified vehicle includes a chassis and an axle assembly. The chassis includes a first frame rail and a second frame rail laterally separated from the first frame rail. The axle assembly includes an axle housing arranged laterally between the first frame rail and the second frame rail. The suspension assembly includes a first linkage rod coupled between the axle housing and the first frame rail, and a second linkage rod coupled between the axle housing and the second frame rail. The first linkage rod is arranged at an angle relative to a central longitudinal axis so that as the first linkage rod extends from the axle housing toward the first frame rail, the first linkage rod angles laterally outwardly and away from the central longitudinal axis. The second linkage rod is arranged at an angle relative to the central longitudinal axis so that as the second linkage rod extends from the axle housing toward the second frame rail, the second linkage rod angles laterally outwardly and away from the central longitudinal axis.

At least one embodiment relates to an electrified vehicle. The electrified vehicle includes a chassis having a first frame rail and a second frame rail laterally separated from the first frame rail, an axle assembly having an axle housing arranged laterally between the first frame rail and the second frame rail, and an energy storage system supported on the chassis, and a suspension assembly. The suspension assembly includes a first linkage rod coupled between the axle housing and the first frame rail, and a second linkage rod coupled between the axle housing and the second frame rail. The first linkage rod is arranged at an angle relative to a central longitudinal axis so that as the first linkage rod extends from the axle housing toward the first frame rail, the first linkage rod angles laterally outwardly and away from the central longitudinal axis. The second linkage rod is arranged at an angle relative to the central longitudinal axis so that as the second linkage rod extends from the axle housing toward the second frame rail, the second linkage rod angles laterally outwardly and away from the central longitudinal axis.

At least one embodiment relates to an electrified vehicle. The electrified vehicle includes a chassis having a first frame rail and a second frame rail laterally separated from the first frame rail, a first axle assembly having a first axle housing arranged laterally between the first frame rail and the second frame rail, a second axle assembly having a second axle housing arranged on an opposing side of a central lateral axis from the first axle housing, an energy storage system supported on the chassis between the first frame rail and the second frame rail, and a suspension assembly. The suspension assembly includes a first linkage rod coupled between the first axle housing and the first frame rail, and a second linkage rod coupled between the second axle housing and the first frame rail. The first linkage rod is arranged at an angle relative to a central longitudinal axis so that as the first linkage rod extends from the first axle housing toward the first frame rail, the first linkage rod angles laterally outwardly and away from the central longitudinal axis. The second linkage rod is arranged at an angle relative to the central longitudinal axis so that as the second linkage rod extends from the second axle housing toward the second frame rail, the second linkage rod angles laterally outwardly and away from the central longitudinal axis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Vehicles (e.g., a commercial vehicle, a refuse vehicle, a fire fighting vehicle, a fire suppression vehicle, a military vehicle, a mixing vehicle, a lift vehicle, etc.) are being electrified by incorporating one or more batteries (e.g., battery cells or battery packs) that are used to supply electrical power to one or more components of the vehicle. The batteries mounted on a vehicle require mounting space, and the amount of available mounting space on a vehicle may limit the amount of batteries, and the energy storage capacity, on the vehicle. In general, conventional suspension assemblies are not designed to incorporate batteries. For example, conventional suspension assemblies include linkages or rods that are arranged within and extend into a space between frame rails of a chassis. Linkages or rods extending into the space between the frame rails prevent batteries from being mounted between the frame rails and/or limit the size or number of batteries mounted between the frame rails.

The systems and methods described herein include a suspension assembly with linkage rods (e.g., upper control links) that are arranged to free up the space between the frame rails on a vehicle. In some embodiments, the linkage rods are extend laterally outwardly so that the linkage rods angle away from a central longitudinal axis and provide more useable area between the frame rails within which batteries may be mounted. The increased area between the frame rails enables more and/or larger batteries to be mounted between the frame rails, when compared to conventional suspension designs, which increases an energy storage capacity available to the vehicle.

Vehicle

Figure 1:
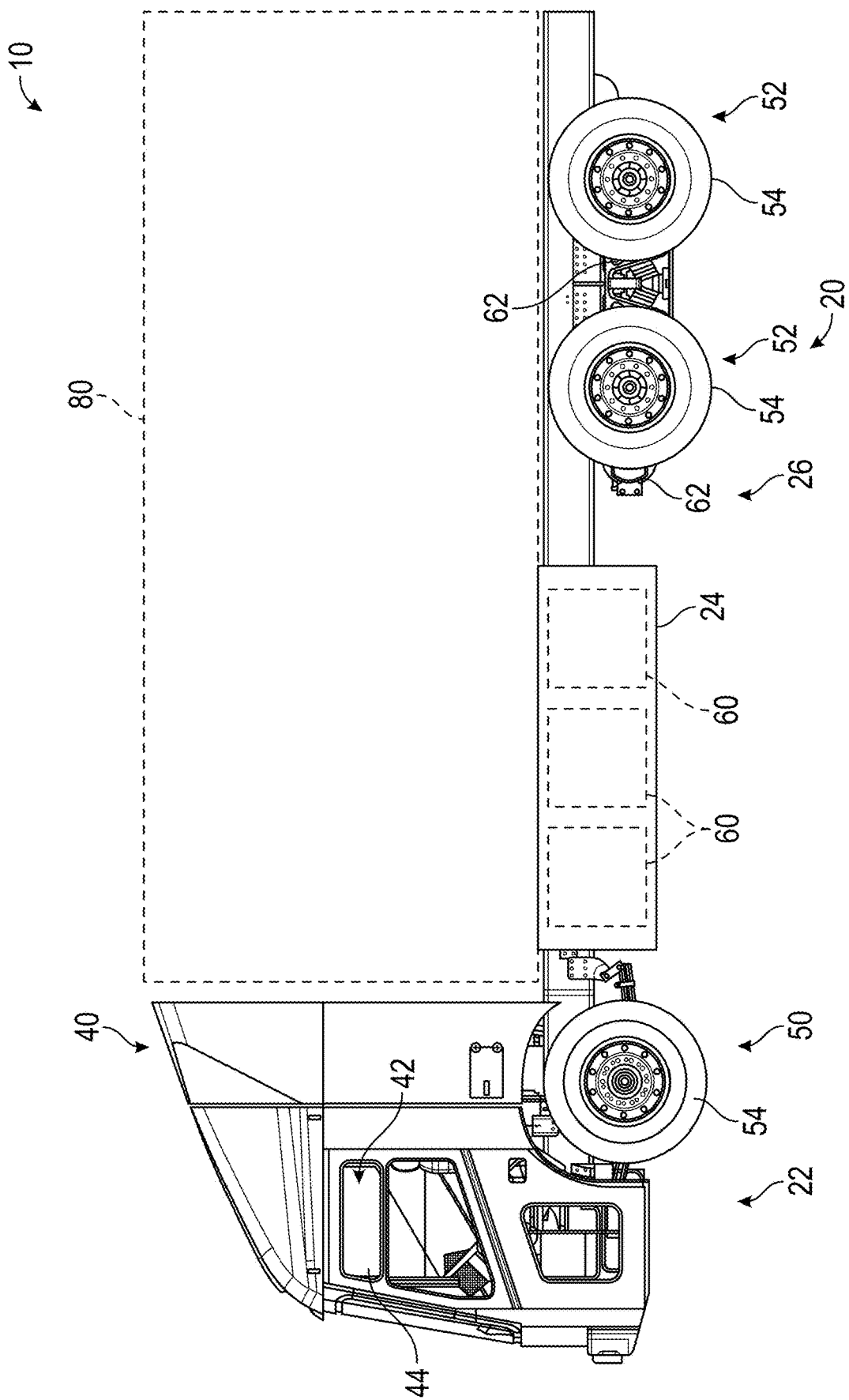
FIG. 1 is a left side view of a vehicle, according to an exemplary embodiment.

According to an exemplary embodiment, as shown in FIG. 1, an electrified vehicle (e.g., a vehicle assembly, a truck, a vehicle base, etc.), shown as vehicle 10, includes a frame assembly or chassis assembly, shown as chassis 20. The chassis assembly may support other components of the vehicle 10. In some embodiments, the chassis 20 extends longitudinally along a length of the vehicle 10. The chassis 20 may extend substantially parallel to a primary direction of travel of the vehicle 10. In some embodiments, the chassis 20 includes a middle section 24 that acts as a storage portion that includes one or more vehicle components. The middle section 24 may include an enclosure that contains one or more vehicle components and/or a frame that supports one or more vehicle components. In some embodiments, the middle section 24 contains or includes one or more electrical energy storage devices (e.g., batteries, capacitors, etc.).

According to an exemplary embodiment, a cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42 that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. In one embodiment, the cab interior 42 contains components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

According to an exemplary embodiment, the vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. In one embodiment, the vehicle 10 includes a tag axle that may be raised or lowered to accommodate variations in weight being carried by the vehicle 10. The front axle 50 and the rear axles 52 each include a plurality of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle 10.

In some embodiments, the vehicle 10 is configured as an electric vehicle that is propelled by an electric powertrain system. As shown in FIG. 1, the vehicle 10 includes one or more electrical energy storage devices (e.g., batteries, battery packs, battery cells, capacitors, etc.), shown as batteries 60. As shown, the batteries 60 are supported on the chassis 20 (e.g., between the frame rails of the chassis 20). In other embodiments, the batteries 60 are otherwise positioned throughout the vehicle 10. The vehicle 10 further includes one or more electromagnetic devices (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 54 and provide electrical energy to the batteries 60, providing a braking force to slow the vehicle 10. As shown, the drive motors 62 are positioned within the rear axles 52 (e.g., as part of a combined axle and motor assembly). In other embodiments, the drive motors 62 are otherwise positioned within the vehicle 10 or within the axle assemblies.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system includes a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 is further configured to support non-hybrid powertrains. For example, the powertrain system may include a primary driver that is a compression-ignition internal combustion engine that utilizes diesel fuel.

As shown in FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 2-7 illustrate various examples of how the vehicle 10 may be configured for specific applications. Although only a certain set of vehicle configurations is shown, it should be understood that the vehicle 10 may be configured for use in other applications that are not shown.

According to an exemplary embodiment, the application kit 80 includes various actuators to facilitate certain functions of the vehicle 10. In one embodiment, the application kit 80 includes hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. In another embodiment, the application kit 80 includes hydraulic or pneumatic components that form a hydraulic or pneumatic circuit (e.g., conduits, valves, pumps, compressors, gauges, reservoirs, accumulators, etc.). By way of another embodiment, the application kit 80 includes electrical components (e.g., batteries, capacitors, voltage regulators, motor controllers, etc.). The actuators may be powered by components of the vehicle 10. In some embodiments, the actuators are powered by the batteries 60, the drive motors 62, or the primary driver (e.g., through a power take off).

Figure 2:
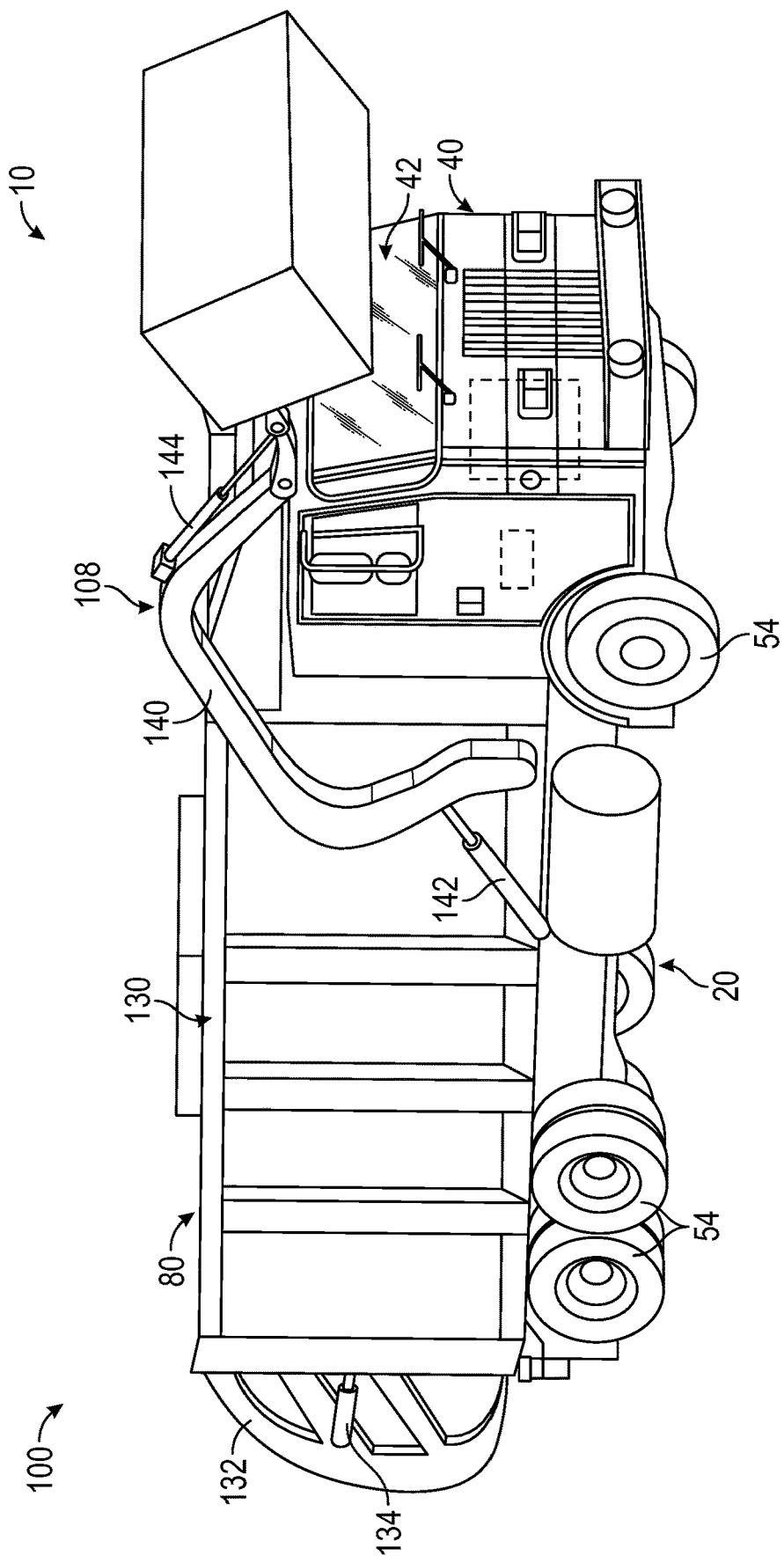
FIG. 2 is a perspective view of the vehicle of FIG. 1 configured as a refuse vehicle, according to an exemplary embodiment.

As shown in FIG. 2, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a side-loading refuse vehicle.

As shown in FIG. 2, the application kit 80 of the refuse vehicle 100 includes a rear body or container, shown as refuse compartment 130, and a pivotable rear portion, shown as tailgate 132. The refuse compartment 130 may facilitate transporting refuse from various waste receptacles within a municipality to a storage and/or a processing facility (e.g., a landfill, an incineration facility, a recycling facility, etc.). According to an exemplary embodiment, loose refuse is placed into the refuse compartment 130 to be compacted. The refuse compartment 130 may also provide temporary storage for refuse during transport to a waste disposal site and/or a recycling facility. In some embodiments, the refuse compartment 130 includes a hopper volume and storage volume. In this regard, refuse may be initially loaded into the hopper volume and later compacted into the storage volume. According to an exemplary embodiment, the hopper volume is positioned between the storage volume and the cab 40 (e.g., refuse is loaded into a position of the refuse compartment 130 behind the cab 40 and stored in a position further toward the rear of the refuse compartment 130). In other embodiments, the storage volume is positioned between the hopper volume and the cab 40 (e.g., in a rear-loading refuse truck, etc.). The tailgate 132 may be pivotally coupled to the refuse compartment 130, and may be movable between a closed position and an open position by an actuator (e.g., a hydraulic cylinder, an electric linear actuator, etc.), shown as tailgate actuator 134 (e.g., to facilitate emptying the storage volume).

As shown in FIG. 2, the refuse vehicle 100 also includes an implement, shown as lift assembly 108 (e.g., a front-loading lift assembly, etc.). According to an exemplary embodiment, the lift assembly 108 includes a pair of lift arms 140, lift arm actuators 142, and articulation actuators 144. The lift arms 140 may be rotatably coupled to the chassis 20. In another embodiment, the lift arms 140 are rotatably coupled to the refuse compartment 30 on each side of the refuse vehicle 100 (e.g., through a pivot, a lug, a shaft, etc.). Such an embodiment provides that the lift assembly 108 extends forward relative to the cab 40 (e.g., a front-loading refuse truck, etc.). In other embodiments, the lift assembly 108 extends rearward relative to the application kit 80 (e.g., a rear-loading refuse truck). In yet other embodiments, the lift assembly 108 extends from a side of the application kit 80 (e.g., a side-loading refuse truck). The lift arm actuators 142 are positioned such that extension and retraction of the lift arm actuators 142 rotates the lift arms 140 about an axis extending through the pivot. In this regard, the lift arms 140 may be rotated by the lift arm actuators 142 to lift a refuse container over the cab 40. In an exemplary embodiment, the articulation actuators 144 are positioned to articulate the distal end of the lift arms 140 (e.g., a portion of the lift arms 140 that may be coupled to the refuse container) in order to assist in tipping refuse out of the refuse container and into the refuse compartment 130. The lift arm actuators 142 may then rotate the lift arms 140 to return the empty refuse container to the ground.

Figure 3:
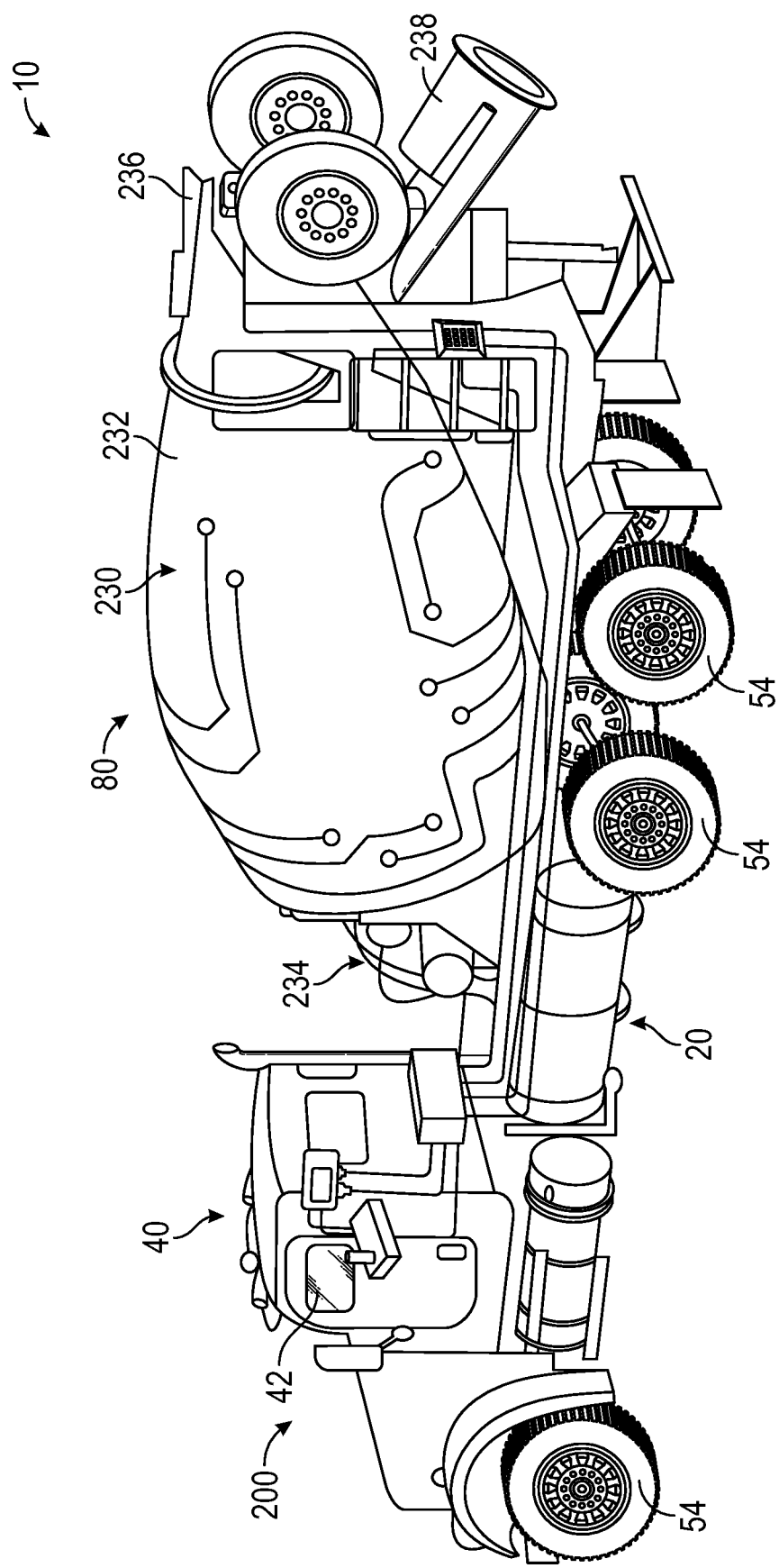
FIG. 3 is a perspective view of the vehicle of FIG. 1 configured as a mixer vehicle, according to an exemplary embodiment.

According to another exemplary embodiment, as shown in FIG. 3, the vehicle 10 is configured as a mixer truck (e.g., a concrete mixer truck, a mixer vehicle, etc.), shown as mixer truck 200. Specifically, the mixer truck 200 is a rear-discharge concrete mixer truck. In other embodiments, the mixer truck 200 is a front-discharge concrete mixer truck.

As shown in FIG. 3, the application kit 80 includes a mixing drum assembly (e.g., a concrete mixing drum), shown as drum assembly 230. The drum assembly 230 includes a mixing drum 232, a drum drive system 234 (e.g., a rotational actuator or motor), an inlet, shown as hopper 236, and an outlet, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 is elevated from the chassis 20 (e.g., from a horizontal plane extending along the chassis 20) at an angle in the range of five degrees to twenty degrees. In other embodiments, the central, longitudinal axis is elevated by less than five degrees (e.g., four degrees, etc.). In yet another embodiment, the mixer truck 200 includes an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves). The injection system may include an injection valve that selectively fluidly couples a supply of fluid to the inner volume of the mixing drum 232. In one embodiment, the injection system is used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) are positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 includes an actuator positioned such that the chute 238 may be selectively pivotable to position the chute 238 (e.g., vertically, laterally, etc.), for example, at an angle at which the mixture is expelled from the mixing drum 232.

Figure 4:
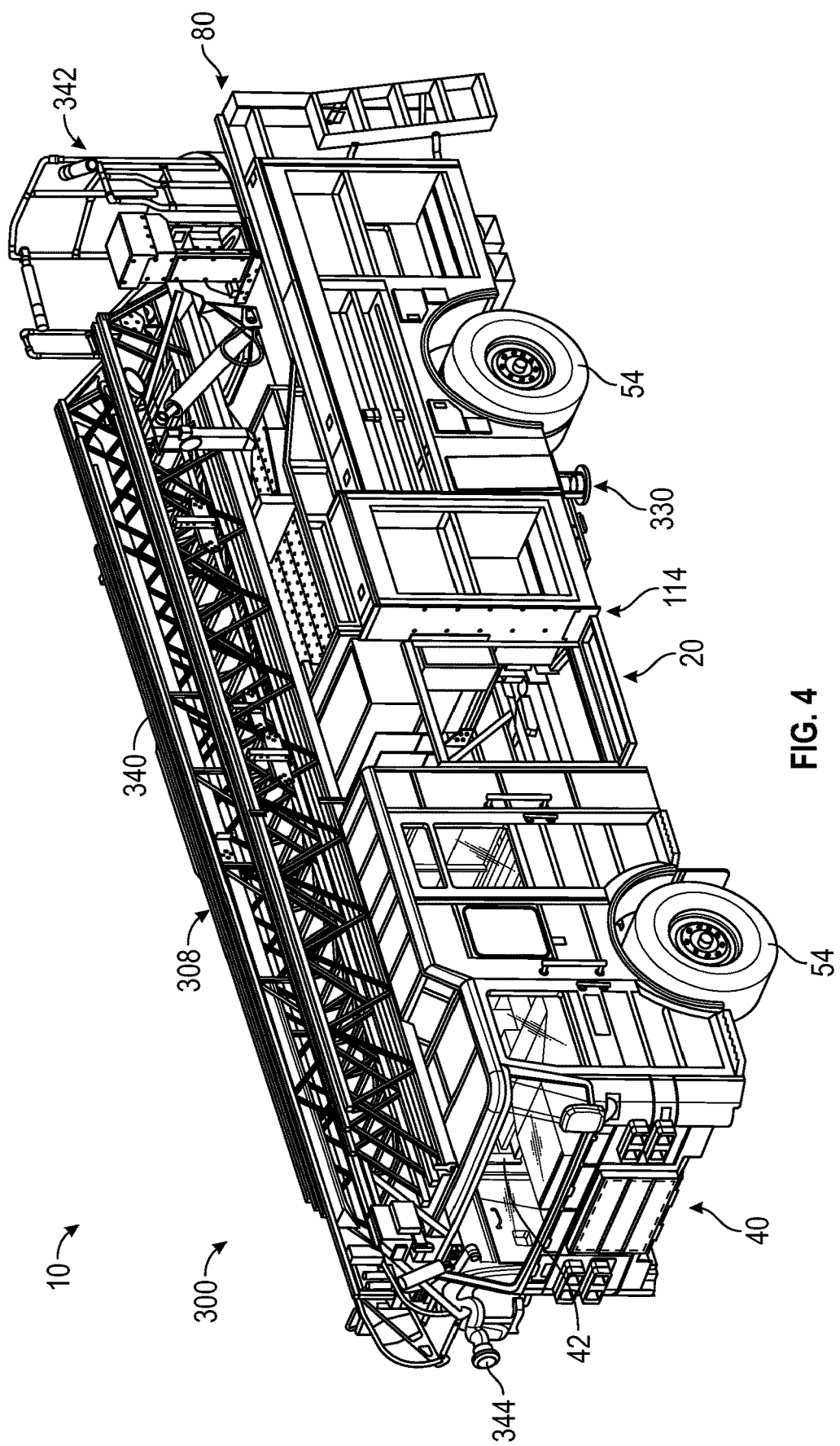
FIG. 4 is a perspective view of the vehicle of FIG. 1 configured as a fire fighting vehicle, according to an exemplary embodiment.

As shown in FIG. 4, the vehicle 10 is configured as a fire fighting vehicle or fire apparatus (e.g., a turntable ladder truck, a pumper truck, a quint, etc.), shown as fire fighting vehicle 300. As shown in FIG. 4, the fire fighting vehicle 300 is configured as a rear-mount aerial ladder truck. In other embodiments, the fire fighting vehicle 300 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. According to an exemplary embodiment, the vehicle 10 is be configured as a police vehicle, an ambulance, a tow truck, or still other vehicles used for responding to a scene (e.g., an accident, a fire, an incident, etc.).

As shown in FIG. 4, in the fire fighting vehicle 300, the application kit 80 is positioned mainly rearward from the cab 40. The application kit 80 includes deployable stabilizers (e.g., outriggers, downriggers, etc.), shown as outriggers 330, that are coupled to the chassis 20. The outriggers 330 may be configured to selectively extend from each lateral side and/or the rear of the fire fighting vehicle 300 and engage a support surface (e.g., the ground) in order to provide increased stability while the fire fighting vehicle 300 is stationary. This increased stability is desirable when the ladder assembly 308 is in use (e.g., extended from the fire fighting vehicle 300) to prevent tipping. In some embodiments, the application kit 80 further includes various storage compartments (e.g., cabinets, lockers, etc.) that are selectively opened and/or accessed for storage and/or component inspection, maintenance, and/or replacement.

As shown in FIG. 4, the application kit 80 includes a ladder assembly 308 coupled to the chassis 20. The ladder assembly 308 includes a series of ladder sections 340 that are slidably coupled with one another such that the ladder sections 340 may extend and/or retract (e.g., telescope) relative to one another to selectively vary a length of the ladder assembly 308. A base platform, shown as turntable 342, is rotatably coupled to the chassis 20 and to a proximal end of a base ladder section 340 (i.e., the most proximal of the ladder sections 340). The turntable 342 may be configured to rotate about a vertical axis relative to the chassis 20 to rotate the ladder sections 340 about the vertical axis (e.g., up to 360 degrees, etc.). The ladder sections 340 may rotate relative to the turntable 342 about a substantially horizontal axis to selectively raise and lower the ladder sections 340 relative to the chassis 20. As shown, a water turret or implement, shown as monitor 344, is coupled to a distal end of a fly ladder section 340 (i.e., the most distal of the ladder sections 340). The monitor 344 may be configured to expel water and/or a fire suppressing agent (e.g., foam, etc.) from a water storage tank and/or an agent tank onboard the fire fighting vehicle 300, and/or from an external source (e.g., a fire hydrant, a separate water/pumper truck, etc.). In some embodiments, the ladder assembly 308 further includes an aerial platform coupled to the distal end of the fly ladder section 340 and configured to support one or more operators.

Figure 5:
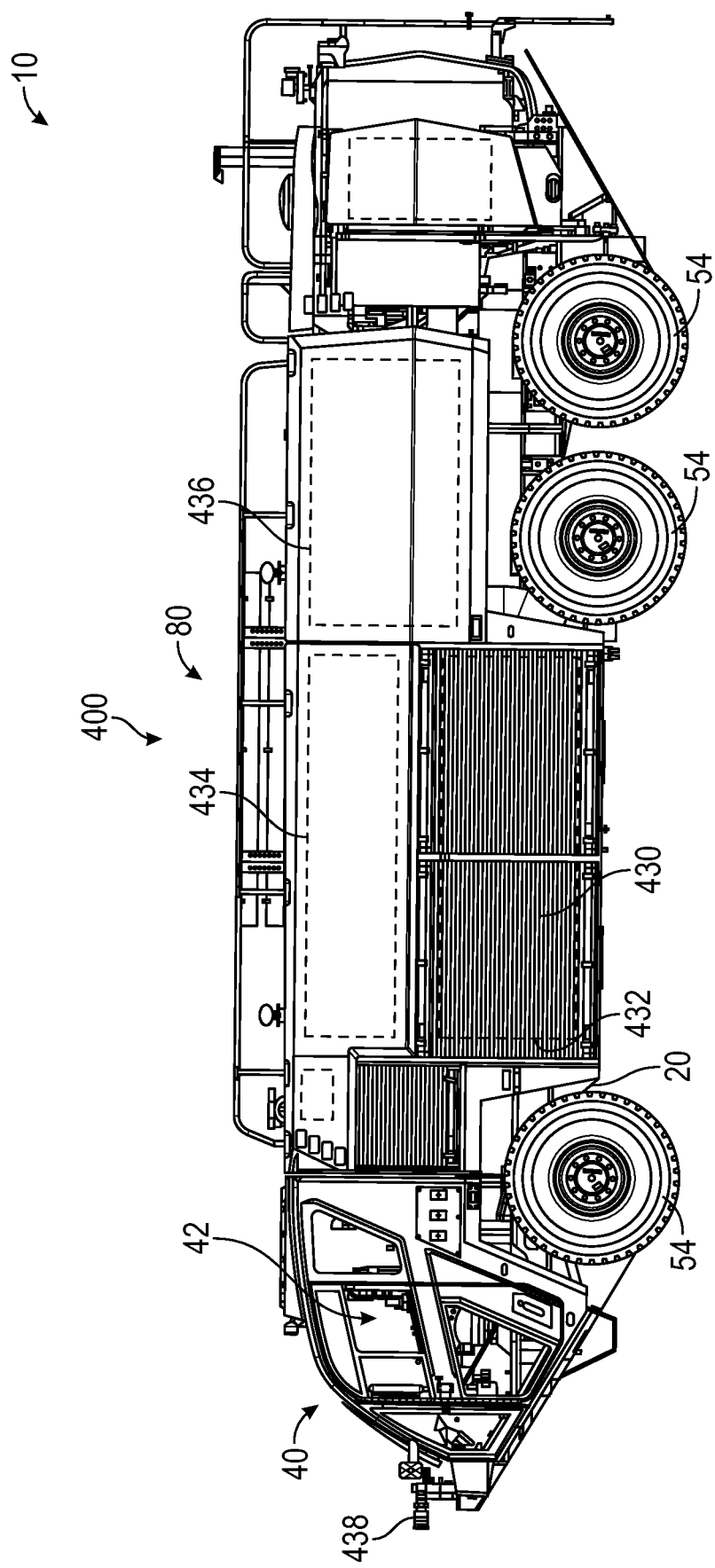
FIG. 5 is a left side view of the vehicle of FIG. 1 configured as an airport fire fighting vehicle, according to an exemplary embodiment.

According to another exemplary embodiment, as shown in FIG. 5, the vehicle 10 is configured as a fire fighting vehicle, shown as airport rescue and fire fighting (ARFF) truck 400. As shown in FIG. 5, the application kit 80 is positioned primarily rearward of the cab 40. As shown, the application kit 80 includes a series of storage compartments or cabinets, shown as compartments 430, that are coupled to the chassis 20. The compartments 430 may store various equipment or components of the ARFF truck 400.

The application kit 80, as shown in FIG. 5, includes a pump system 432 (e.g., an ultra-high-pressure pump system, etc.) positioned within one of the compartments 430 near the center of the ARFF truck 400. The application kit 80 further includes a water tank 434, an agent tank 436, and an implement or water turret, shown as monitor 438. The pump system 432 may include a high pressure pump and/or a low pressure pump, which may be fluidly coupled to the water tank 434 and/or the agent tank 436. The pump system 432 may pump water and/or fire suppressing agent from the water tank 434 and the agent tank 436, respectively, to the monitor 438. The monitor 438 may be selectively reoriented by an operator to adjust a direction of a stream of water and/or agent. As shown in FIG. 5, the monitor 438 is coupled to a front end of the cab 40.

Figure 6:
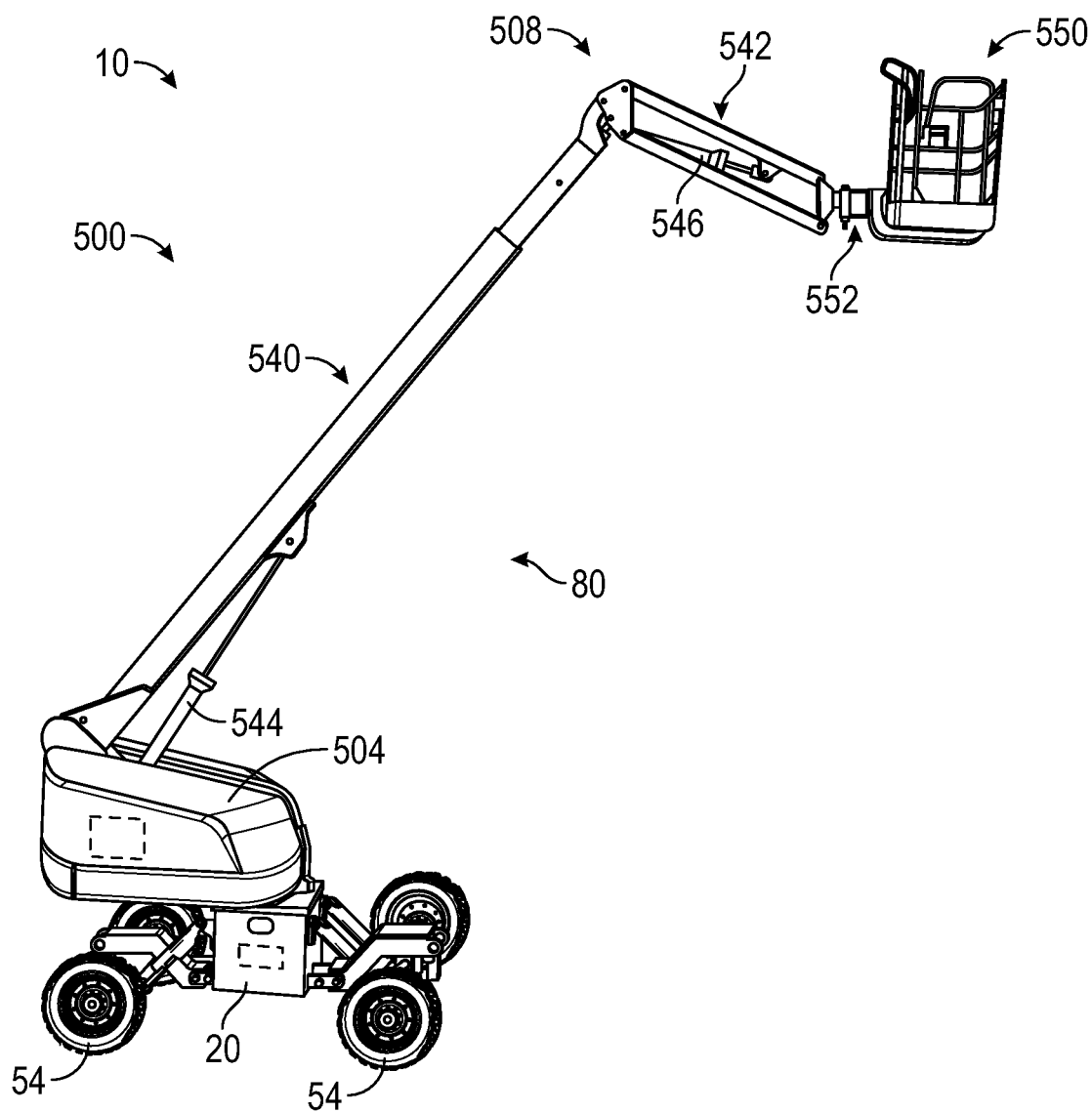
FIG. 6 is a perspective view of the vehicle of FIG. 1 configured as a boom lift, according to an exemplary embodiment.

As shown in FIG. 6, the vehicle 10 is configured as a lift device, shown as boom lift 500. The boom lift 500 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 6, the application kit 80 includes a base assembly, shown as turntable 504 that is rotatably coupled to the chassis 20. The turntable 504 may be configured to selectively rotate relative to the chassis 20 about a substantially vertical axis. In some embodiments, the turntable 504 includes a counterweight positioned near the rear of the turntable 504. The turntable 504 is rotatably coupled to a lift assembly, shown as boom assembly 508. The boom assembly 508 includes a first section or telescoping boom section, shown as lower boom 540. The lower boom 540 includes a series of nested boom sections that extend and retract (e.g., telescope) relative to one another to vary a length of the boom assembly 508. The boom assembly 508 further includes a second boom section or four bar linkage, shown as upper boom 542. The upper boom 542 may include structural members that rotate relative to one another to raise and lower a distal end of the boom assembly 508. In other embodiments, the boom assembly 508 includes more or fewer boom sections (e.g., one, three, five, etc.) and/or a different arrangement of boom sections.

As shown in FIG. 6, the boom assembly 508 includes a first actuator, shown as lower lift cylinder 544. The lower boom 540 is pivotally coupled (e.g., pinned, etc.) to the turntable 504 at a joint or lower boom pivot point. The lower lift cylinder 544 (e.g., a pneumatic cylinder, an electric actuator, a hydraulic cylinder, etc.) is coupled to the turntable 504 at a first end and coupled to the lower boom 540 at a second end. The lower lift cylinder 544 may be configured to raise and lower the lower boom 540 relative to the turntable 504 about the lower boom pivot point.

The boom assembly 508 further includes a second actuator, shown as upper lift cylinder 546. The upper boom 542 is pivotally coupled (e.g., pinned) to the upper end of the lower boom 540 at a joint or upper boom pivot point. The upper lift cylinder 546 (e.g., a pneumatic cylinder, an electric actuator, a hydraulic cylinder, etc.) is coupled to the upper boom 542. The upper lift cylinder 546 may be configured to extend and retract to actuate (e.g., lift, rotate, elevate, etc.) the upper boom 542, thereby raising and lowering a distal end of the upper boom 542.

As shown in FIG. 6, the application kit 80 further includes an operator platform, shown as platform assembly 550, coupled to the distal end of the upper boom 542 by an extension arm, shown as jib arm 552. The jib arm 552 may be configured to pivot the platform assembly 550 about a lateral axis (e.g., to move the platform assembly 550 up and down, etc.) and/or about a vertical axis (e.g., to move the platform assembly 550 left and right, etc.).

According to an exemplary embodiment, the platform assembly 550 provides a platform configured to support one or more operators or users. In some embodiments, the platform assembly 550 includes accessories or tools configured for use by the operators. In one embodiment, the platform assembly 550 includes pneumatic tools (e.g., an impact wrench, airbrush, nail gun, ratchet, etc.), plasma cutters, welders, spotlights, etc. In other embodiments, the platform assembly 550 includes a control panel (e.g., a user interface, a removable or detachable control panel, etc.) configured to control operation of the boom lift 500 (e.g., the turntable 504, the boom assembly 508, etc.) from the platform assembly 550 or remotely. In other embodiments, the platform assembly 550 is omitted, and the boom lift 500 includes an accessory and/or tool (e.g., forklift forks, etc.) coupled to the distal end of the boom assembly 508.

Figure 7:
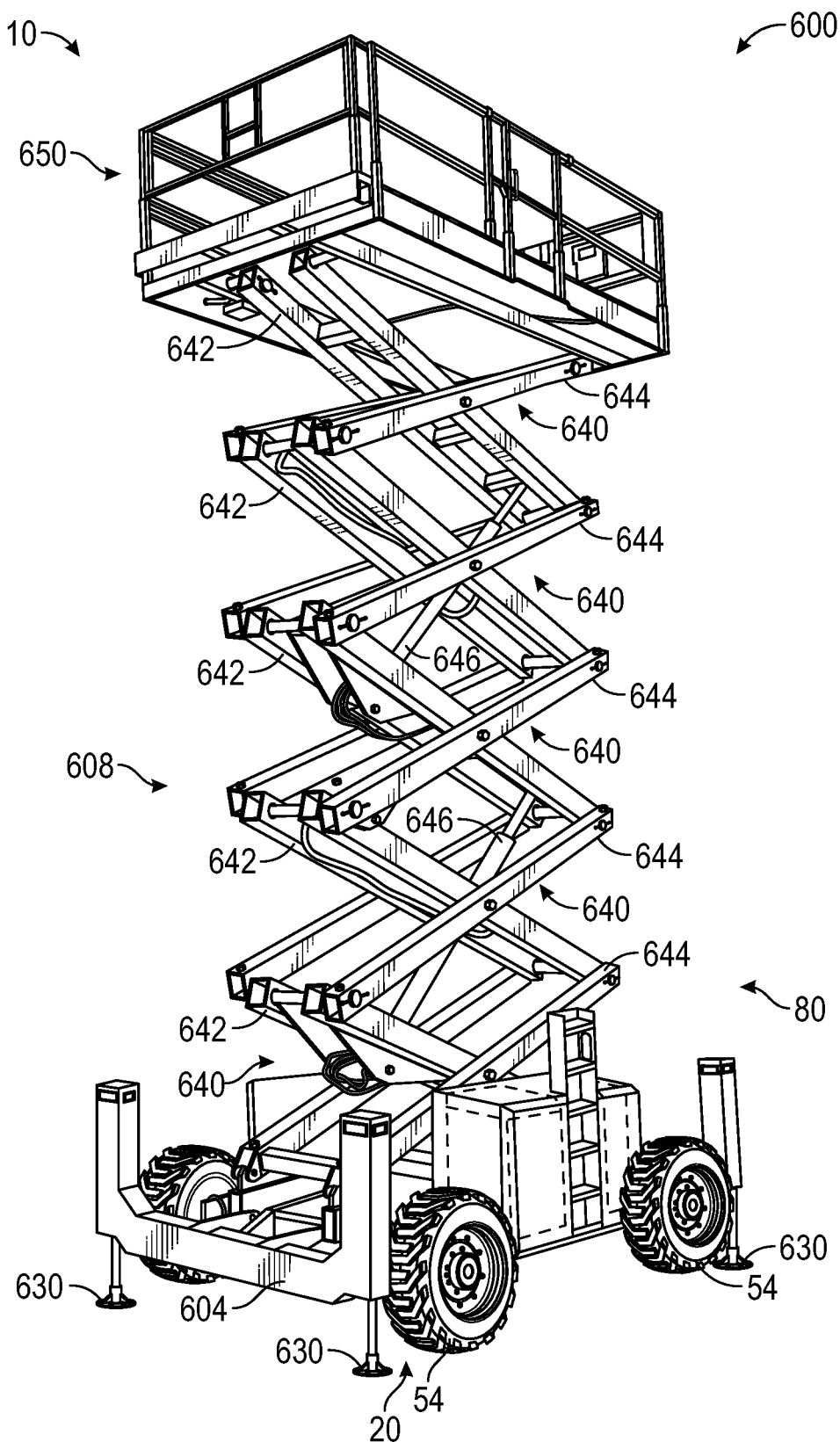
FIG. 7 is a perspective view of the vehicle of FIG. 1 configured as a scissor lift, according to an exemplary embodiment.

According to an exemplary embodiment, as shown in FIG. 7, the vehicle 10 is configured as a lift device, shown as scissor lift 600. As shown in FIG. 7, the application kit 80 includes a body, shown as lift base 604, coupled to the chassis 20. The lift base 604 is coupled to a scissor assembly, shown as lift assembly 608, such that the lift base 604 supports the lift assembly 608. The lift assembly 608 is configured to extend and retract, raising and lowering between a raised position and a lowered position relative to the lift base 604.

As shown in FIG. 7, the lift base 604 includes a series of actuators, stabilizers, downriggers, or outriggers, shown as leveling actuators 630. The leveling actuators 630 may extend and retract vertically between a stored position and a deployed position. In the stored position, the leveling actuators 630 may be raised, such that the leveling actuators 630 do not contact the ground. Conversely, in the deployed position, the leveling actuators 630 may engage the ground to lift the base assembly 604. The length of each of the leveling actuators 630 in their respective deployed positions may be varied in order to adjust the pitch (e.g., rotational position about a lateral axis) and the roll (e.g., rotational position about a longitudinal axis) of the base assembly 604 and/or the chassis 20. Accordingly, the lengths of the leveling actuators 630 in their respective deployed positions may be adjusted to level the base assembly 604 with respect to the direction of gravity (e.g., on uneven, sloped, pitted, etc. terrain). The leveling actuators 630 may lift the wheel and tire assemblies 54 off of the ground to prevent movement of the scissor lift 600 during operation. In other embodiments, the leveling actuators 630 are omitted.

According to an exemplary embodiment, the lift assembly 608 includes a series of subassemblies, shown as scissor layers 640, each including a pair of inner members 642 and a pair of outer members 644. The scissor layers 640 may be stacked atop one another in order to form the lift assembly 608. The inner members 642 may be pivotally coupled to the outer members 644 near the center of both the inner members 642 and the outer members 644. In this regard, the inner members 642 may pivot relative to the outer members 644 about a lateral axis. Each of the inner members 642 and the outer members 644 may include a top end and a bottom end. The bottom end of each inner member 642 may be pivotally coupled to the top end of the outer member 644 immediately below it, and the bottom end of each outer member 644 may be pivotally coupled to the top end of the inner member immediately below it. Accordingly, each of the scissor layers 640 may be coupled to one another such that movement of one scissor layer 640 causes a similar movement in all of the other scissor layers 640. The bottom ends of the inner member 642 and the outer member 644 that make up the lowermost scissor layer 640 may be coupled to the base assembly 604. The top beds of the inner member 642 and the outer member 644 that make up the uppermost scissor layer 640 may be coupled to the platform assembly 650. In some embodiments, scissor layers 640 may be added to, or removed from, the lift assembly 608 in order to increase, or decrease, the fully extended height of the lift assembly 608.

As shown in FIG. 7, the lift assembly 608 also includes one or more lift actuators 646 (e.g., hydraulic cylinders, pneumatic cylinders, motor-driven leadscrews, etc.) configured to extend and retract the lift assembly 608. The lift actuators 646 may be pivotally coupled to an inner member 642 at a first end and pivotally coupled to an inner member 642 of another scissor layer 640 at a second end. In an exemplary embodiment, these inner members 642 belong to a first scissor layer 640 and a second scissor layer 640 (which may be separated by a third scissor layer 640). In other embodiments, the lift actuators 646 are arranged in other configurations (e.g., the first scissor layer 640 and the second scissor layer 640 are not separated by a third scissor layer 640, etc.).

According to an exemplary embodiment, a distal or upper end of the lift assembly 608 is coupled to an operator platform, shown as platform assembly 650. The lift actuators 646 may be configured to actuate the lift assembly 608 to selectively reposition the platform assembly 650 between a lowered position (e.g., where the platform assembly 650 is proximate to the lift base 604) and a raised position (e.g., where the platform assembly 650 is at an elevated height relative to the lift base 604). Specifically, in some embodiments, extension of the lift actuators 646 moves the platform assembly 650 upward (e.g., extending the lift assembly 608), and retraction of the lift actuators 646 moves the platform assembly 650 downward (e.g., retracting the lift assembly 608). In other embodiments, extension of the lift actuators 646 retracts the lift assembly 608, and retraction of the lift actuators 646 extends the lift assembly 608. In some embodiments, the outer members 644 are parallel to and/or in contact with one another when the lift assembly 608 is in the stored position.

In some embodiments, the platform assembly 650 includes a platform that is configured to support one or more operators or users. Similar to the platform assembly 550, the platform assembly 650 may include accessories or tools (e.g., pneumatic tools, plasma cutters, welders, spotlights, etc.) configured for use by an operator. The platform assembly 650 may include a control panel to control operation of the scissor lift 600.

Suspension Assembly

FIGS. 8-12 illustrate a suspension assembly 700 of an electrified vehicle (e.g., a commercial vehicle, a refuse vehicle, a fire fighting vehicle, a fire suppression vehicle, a military vehicle, a mixing vehicle, a lift vehicle, etc.). In some embodiments, the suspension assembly 700 is included on any configuration of the vehicle 10 described herein. In general, the suspension assembly 700 is coupled between a chassis 702 (e.g., the chassis 20) and one or more axles 704 (e.g., the front axle 50 and/or the rear axle 52). In some embodiments, the chassis 702 includes a pair of frame portions, frame members, or frame rails, shown as a first frame rail 706 and a second frame rail 708. The first frame rail 706 is laterally separated from the second frame rail 708, which provides frame stiffness and space for vehicle components (e.g., batteries, motors, axles, gears, etc.) between the first frame rail 706 and the second frame rail 708. The first frame rail 706 and the second frame rail 708 both extend longitudinally and parallel to one another (e.g., parallel to a central longitudinal axis 710) and along a length of the electrified vehicle. In some embodiments, the first frame rail 706 and the second frame rail 708 both define a C-shaped cross-section (see FIG. 11), for example, taken along an axis parallel to a central lateral axis 712. In some embodiments, the first frame rail 706 and the second frame rail 708 define other shapes (e.g., I-beams, rectangular beams, etc.).

In some embodiments, the axles 704 include a first or front axle 714 (e.g., the front axle 50) and a second or rear axle 716 (e.g., one of the rear axles 52). In some embodiments, the axles 704 include more than one front axle 714 (e.g., two or more). In some embodiments, the axles 704 include more than one rear axle 716 (e.g., two or more). The front axle 714 is longitudinally separated from the rear axle 716. In some embodiments, the front axle 714 includes an axle housing 718, a first half-shaft assembly 720 extending laterally outwardly from one side of the axle housing 718, and a second half-shaft assembly 722 extending laterally outwardly from an opposing side of the axle housing 718. The axle housing 718 is arranged laterally between the first frame rail 706 and the second frame rail 708. The first half-shaft assembly 720 and the second half-shaft assembly 722 are aligned along a first axle axis 724 (see FIG. 10). A wheel hub 726 is arranged at a distal end of each of the first half-shaft assembly 720 and the second half-shaft assembly 722. The wheel hubs 726 are each configured to couple to a tractive element or wheel (e.g., a wheel 54).

Similar to the front axle 714, the rear axle 716 includes an axle housing 728, a first half-shaft assembly 730 extending laterally outwardly from one side of the axle housing 728, and a second half-shaft assembly 732 extending laterally outwardly from an opposing side of the axle housing 728. The axle housing 728 is arranged laterally between the first frame rail 706 and the second frame rail 708. The first half-shaft assembly 730 and the second half-shaft assembly 732 are aligned along a second axle axis 734 (see FIG. 10). A wheel hub 736 is arranged at a distal end of each of the first half-shaft assembly 730 and the second half-shaft assembly 732. The wheel hubs 736 are each configured to couple to a tractive element or wheel (e.g., a wheel 54).

The suspension assembly 700 includes a pair of front linkage rods 740, a pair of rear linkage rods 742, a first or right bracket 744, and a second or left bracket 746. In general, the front linkage rods 740 are coupled between the front axle 714 and the chassis 702, and the rear linkage rods 742 are coupled between the rear axle 716 and the chassis 702. In some embodiments, the front linkage rods 740 include a first front linkage rod 748 coupled between the axle housing 718 and the first frame rail 706 and a second front linkage rod 750 coupled between the axle housing 718 and the second frame rail 708. In some embodiments, the first front linkage rod 748 and the second front linkage rod 750 may be coupled to the axle housing 718 at one or more mounting points (e.g., bolt holes, protrusions, flanges, brackets, etc.). In some embodiments, the rear linkage rods 742 include a first rear linkage rod 752 coupled between the axle housing 728 and the first frame rail 706, and a second rear linkage rod 754 coupled between the axle housing 728 and the second frame rail 708. In some embodiments, the first rear linkage rod 752 and the second rear linkage rod 754 may be coupled to the axle housing 728 at one or more mounting points (e.g., bolt holes, protrusions, flanges, brackets, etc.).

The front linkage rods 740 and the rear linkage rods 742 are in a symmetric arrangement, which differs from conventional upper control linkages that are arranged asymmetrically and typically only couple to one frame rail, rather than symmetrically to both frame rails. For example, the first front linkage rod 748 and the second front linkage rod 750 are arranged symmetrically about the central longitudinal axis 710, and the first rear linkage rod 752 and the second rear linkage rod 754 are arranged symmetrically about the central longitudinal axis 710. In addition, the first front linkage rod 748 and the first rear linkage rod 752 are arranged symmetrically about the central lateral axis 712, and the second front linkage rod 750 and the second rear linkage rod 754 are arranged symmetrically about the central lateral axis 712. The symmetric arrangement of the front linkage rods 740 and the rear linkage rods 742 provides stability to the axles 704 and does not require the use of separated, asymmetric upper control linkages that extend in perpendicular directions (e.g., one lateral linkage and one longitudinal linkage) like those used in conventional suspension assemblies.

Figure 8:
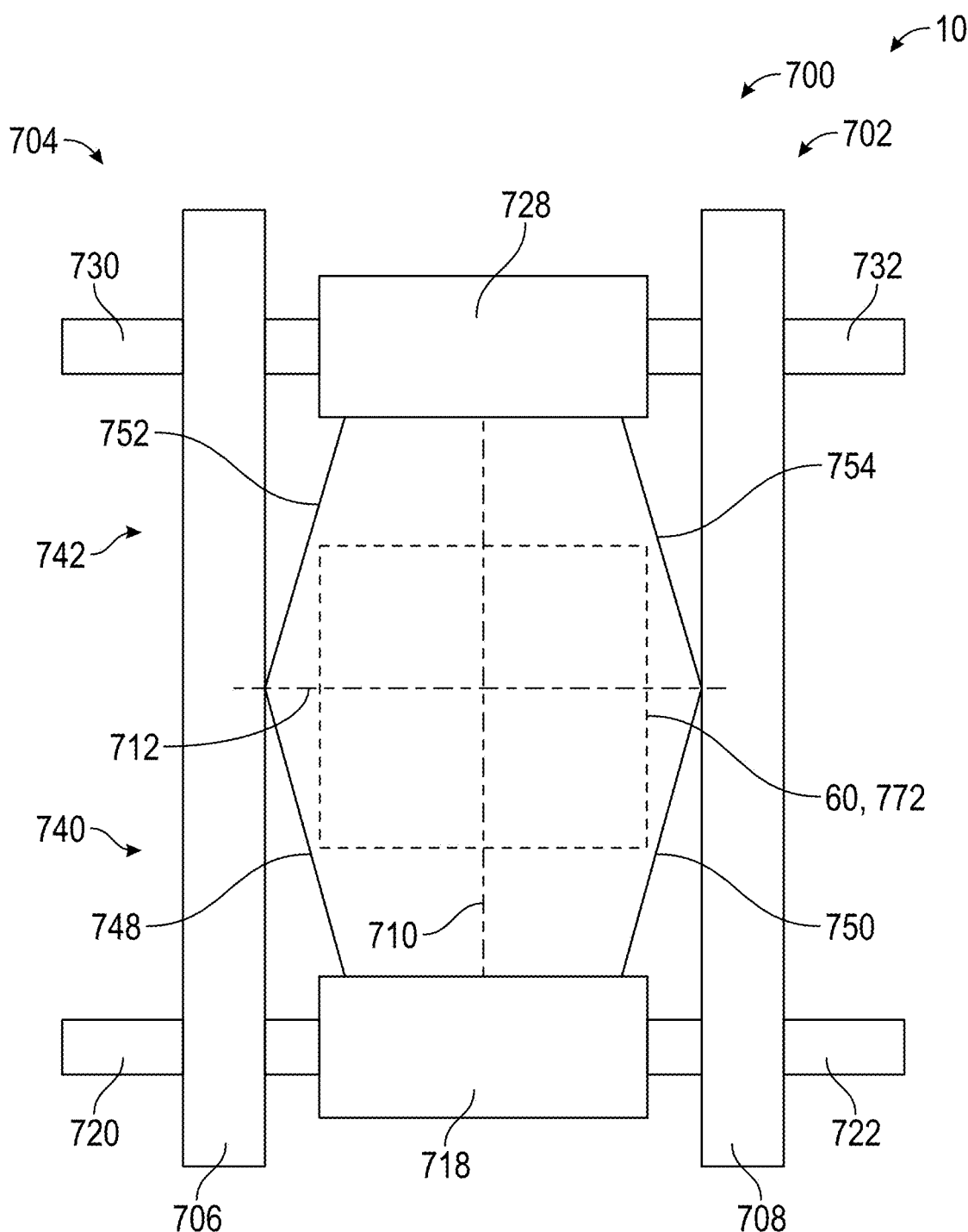
FIG. 8 is a schematic illustration of a suspension assembly of a vehicle, according to an exemplary embodiment.
Figure 9:
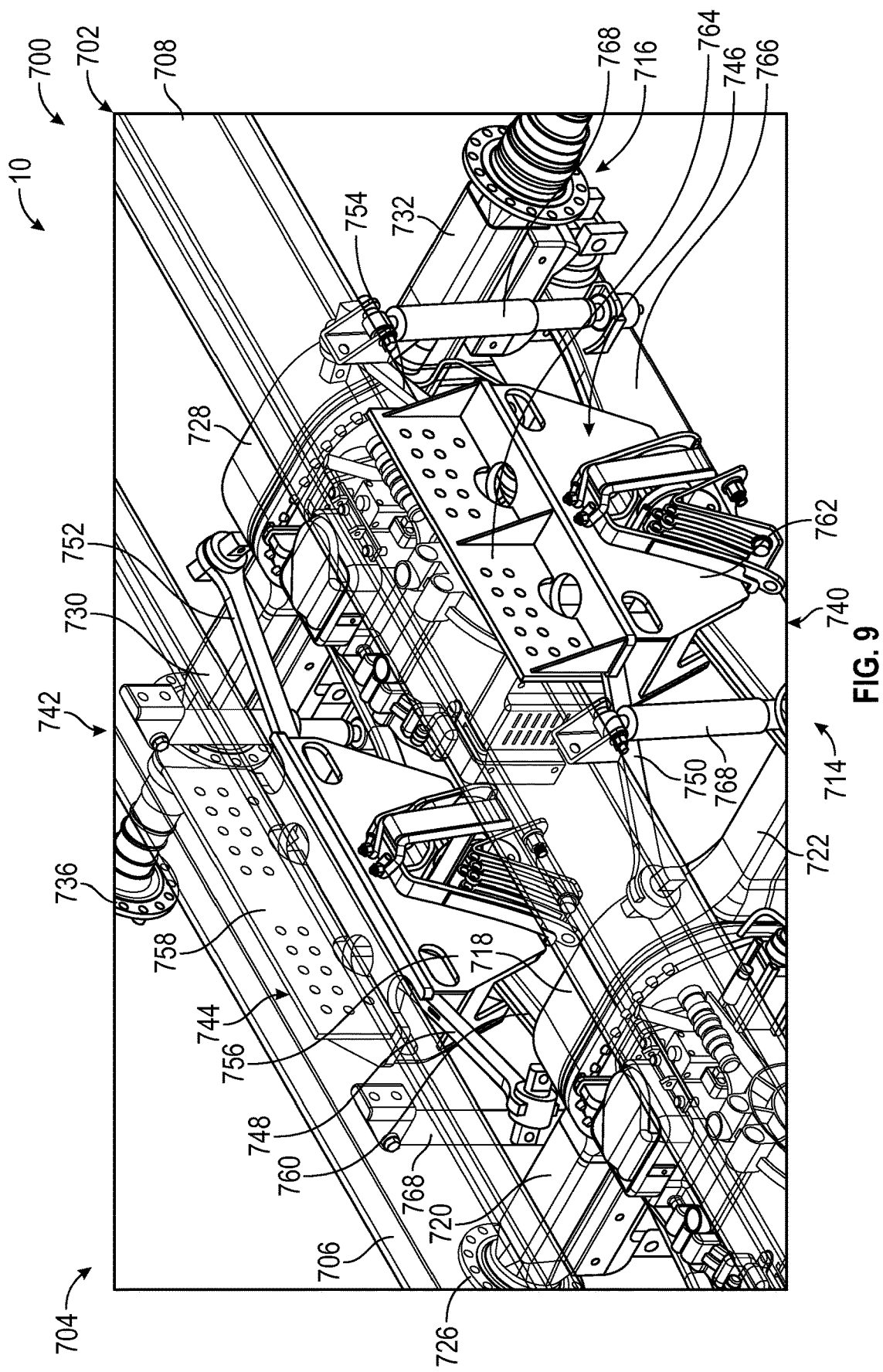
FIG. 9 is a top perspective view of a suspension assembly of a vehicle with a first frame rail and a second frame rail being transparent, according to an exemplary embodiment.

In general, the front linkage rods 740 and the rear linkage rods 742 are oriented so that they provide an open area between the first frame rail 706 and the second frame rail 708 within which batteries (e.g., batteries 60) may be mounted (see FIG. 8). For example, each of the first front linkage rod 748, the second front linkage rod 750, the first rear linkage rod 752, and the second rear linkage rod 754 is angled laterally outwardly away from the central longitudinal axis 710 to free up and not interrupt the area between the first frame rail 706 and the second frame rail 708. Specifically, the first front linkage rod 748 is arranged at an angle relative to the central longitudinal axis 710 so that as the first front linkage rod 748 extends from the axle housing 718 toward the first frame rail 706, the first front linkage rod 748 angles laterally outwardly and away from the central longitudinal axis 710. The second front linkage rod 750 is arranged at an angle relative to the central longitudinal axis 710 so that as the second front linkage rod 750 extends from the axle housing 718 toward the second frame rail 708, the second front linkage rod 750 angles laterally outwardly and away from the central longitudinal axis 710. The first rear linkage rod 752 is arranged at an angle relative to the central longitudinal axis 710 so that as the first rear linkage rod 752 extends from the axle housing 728 toward the first frame rail 706, the first rear linkage rod 752 angles laterally outwardly and away from the central longitudinal axis 710. The second rear linkage rod 754 is arranged at an angle relative to the central longitudinal axis 710 so that as the second rear linkage rod 754 extends from the axle housing 728 toward the second frame rail 708, the second rear linkage rod 754 angles laterally outwardly and away from the central longitudinal axis 710. In other words, the first front linkage rod 748 and the first rear linkage rod 752 angle laterally outwardly toward the first frame rail 706 as they extend toward the first frame rail 706, and the second front linkage rod 750 and the second rear linkage rod 754 angle laterally outwardly toward the second frame rail 708 as they extend toward the second frame rail 708.

In addition to the angled arrangement of the front linkage rods 740 and the rear linkage rods 742 providing increased free area between the first frame rail 706 and the second frame rail 708, the angled arrangement also forms virtual centers that restrain and locate the axles 704 laterally similar to a physical pivot or a laterally-installed linkage. The front linkage rods 740 form a front virtual center at a point where central axes extending longitudinally along the first front linkage rod 748 and the second front linkage rod 750 intersect. The front virtual center laterally locates and restrains the front axle 714. The rear linkage rods 742 form a rear virtual center at a point where central axes extending longitudinally along the first rear linkage rod 752 and the second rear linkage rod 754 intersect. The rear virtual center laterally locates and restrains the rear axle 716.

The first front linkage rod 748 and the first rear linkage rod 752 are both coupled to the first frame rail 706 by the first bracket 744. The first bracket 744 includes a lower housing 756 and a mounting plate 758 extending upwardly (e.g., from the perspective of FIG. 8) from the lower housing 756. An end of both the first front linkage rod 748 and the first rear linkage rod 752 extends into and couples to the lower housing 756. The lower housing 756 at least partially extends over and receives at least portion of a first spring beam 760. The first spring beam 760 extends longitudinally and is coupled between the first half-shaft assembly 720 and the first half-shaft assembly 730. In some embodiments, the mounting plate 758 includes a plurality of mounting apertures that extend through the mounting plate 758 that are configured to receive a fastener (e.g., a screw, a bolt/nut, etc.) that couples the mounting plate 758, and thereby the first bracket 744, to the first frame rail 706.

The second front linkage rod 750 and the second rear linkage rod 754 are both coupled to the second frame rail 708 by the second bracket 746. The second bracket 746 includes a lower housing 762 and a mounting plate 764 extending upwardly (e.g., from the perspective of FIG. 8) from the lower housing 762. An end of both of the second front linkage rod 750 and the second rear linkage rod 754 extends into and couples to the lower housing 762. The lower housing 762 at least partially extends over and receives at least a portion of a second spring beam 766. The second spring beam 766 extends longitudinally and is coupled between the second half-shaft assembly 722 and the second half-shaft assembly 732. In some embodiments, the mounting plate 764 includes a plurality of mounting apertures that extend through the mounting plate 764 that are configured to receive a fastener (e.g., a screw, a bolt/nut, etc.) that couples the mounting plate 764, and thereby the second bracket 746, to the second frame rail 708.

Figure 10:
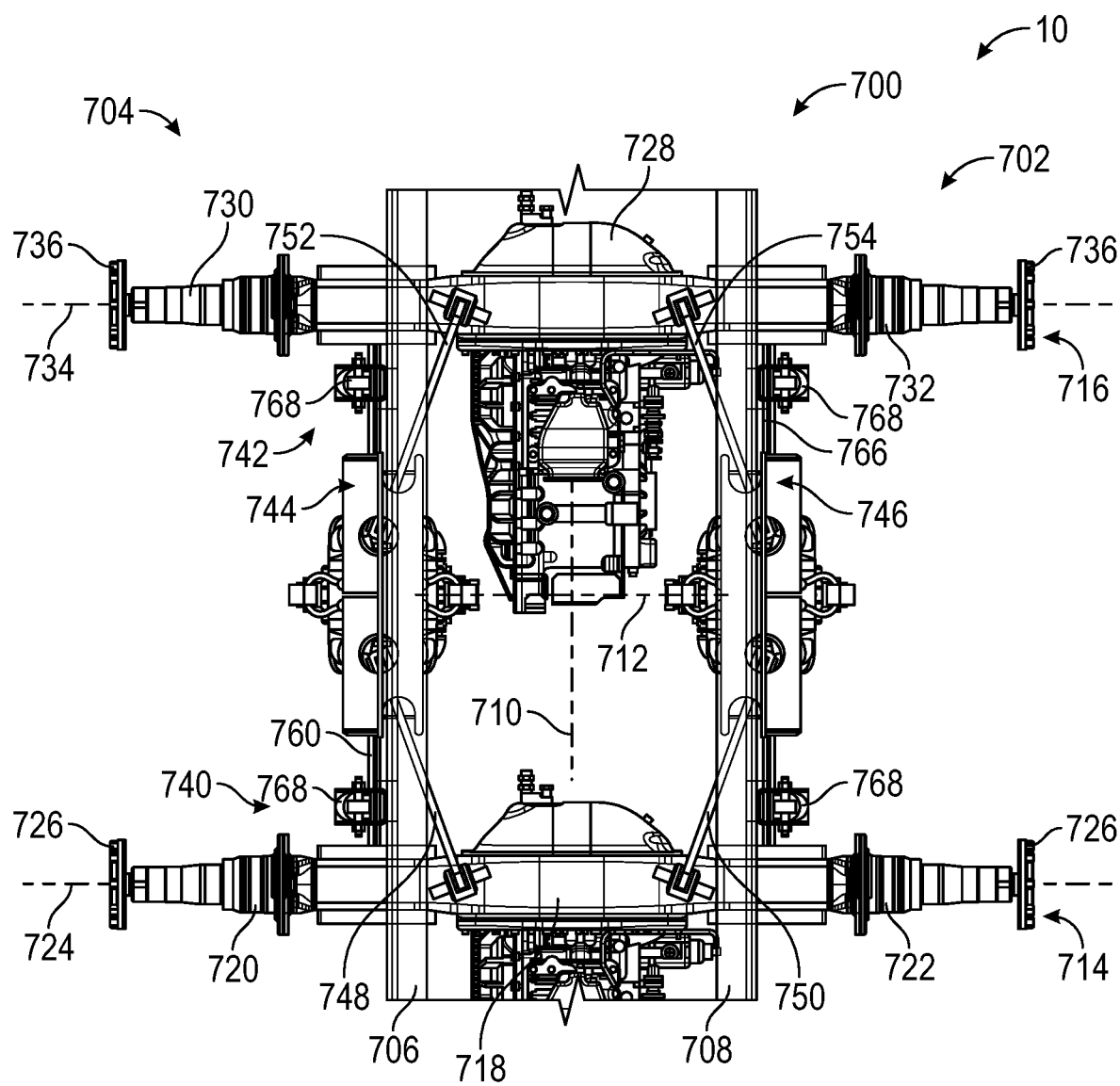
FIG. 10 is a top view of the suspension assembly of FIG. 9.
Figure 11:
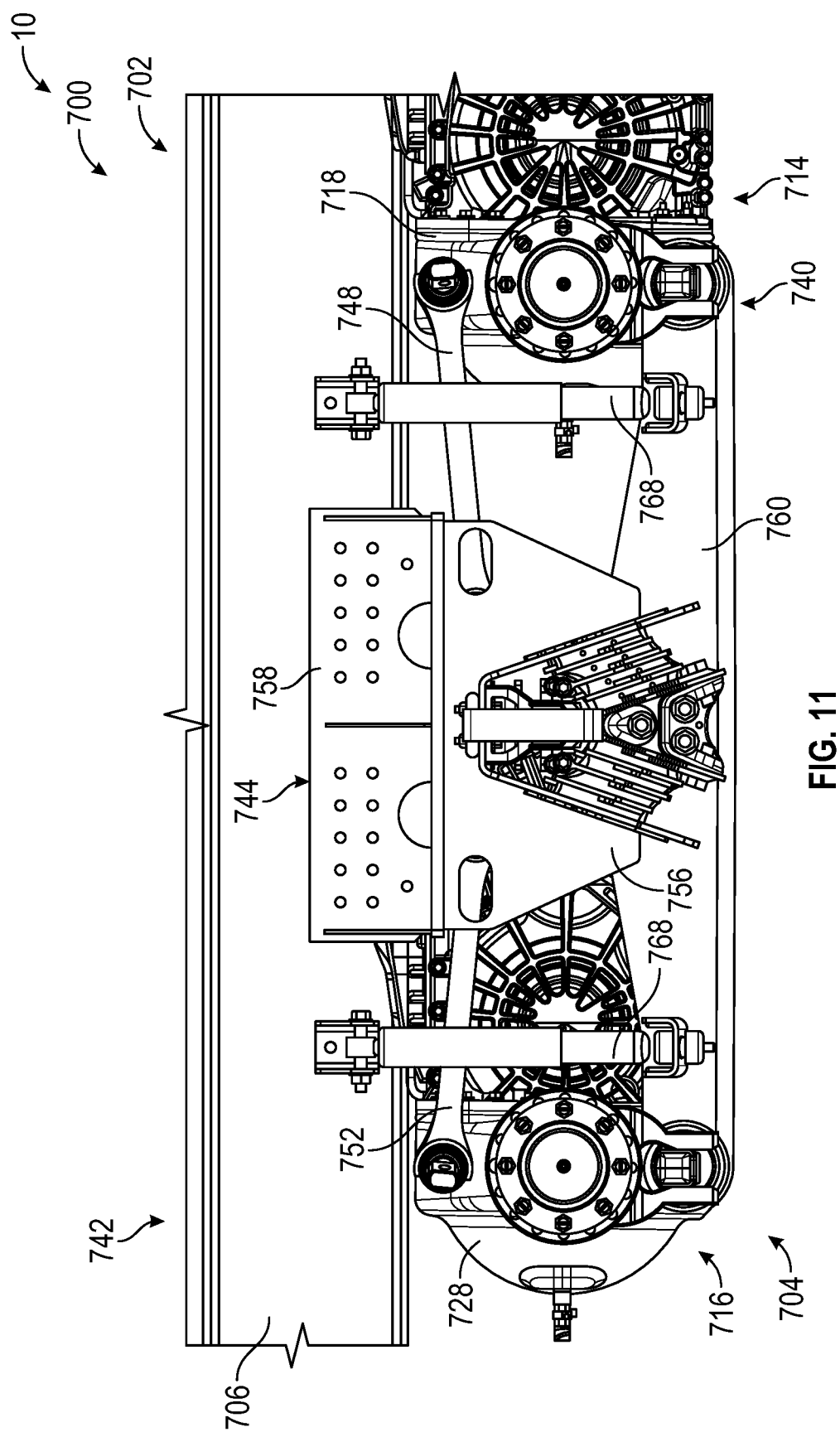
FIG. 11 is a side view of the suspension assembly of FIG. 9.
Figure 12:
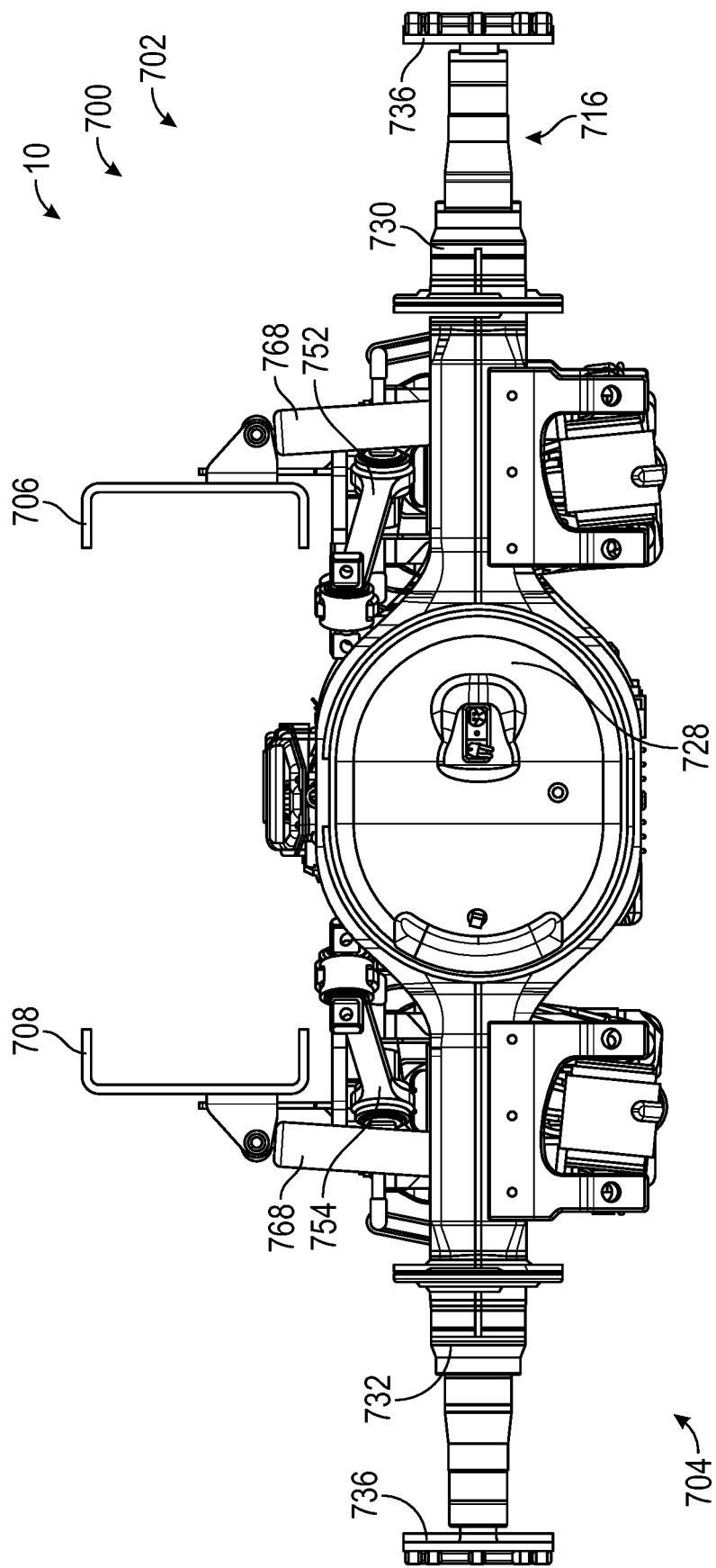
FIG. 12 is a front view of the suspension assembly of FIG. 9.

In some embodiments, the front linkage rods 740 and the rear linkage rods 742 extend downwardly (e.g., in a direction away from the respective one of the first frame rail 706 and the second frame rail 708) as they extend toward the respective bracket (e.g., the first bracket 744 or the second bracket 746 (see FIGS. 10 and 11). For example, the first front linkage rod 748 and the first rear linkage rod 752 angle downwardly in a direction away from the first frame rail 706 as they extend toward the first bracket 744. Similarly, the second front linkage rod 750 and the second rear linkage rod 754 angle downwardly in a direction away from the second frame rail 708 as they extend toward the second bracket 746.

In some embodiments, the suspension assembly 700 includes a plurality of spring damping cylinders 768. For example, the suspension assembly 700 may include two spring damping cylinders 768 coupled between the first spring beam 760 and the first frame rail 706 and arranged on longitudinally opposing sides of the first bracket 744, and two spring damping cylinders 768 coupled between the second spring beam 766 and the second frame rail 708 and arranged on longitudinally opposing sides of the second bracket 746.

In general, the design and properties of the suspension assembly 700, and specifically the arrangement of the front linkage rods 740 and the rear linkage rods 742, provides increased mounting area between the first frame rail 706 and the second frame rail 708, when compared to conventional suspension assemblies, without compromising suspension performance. The increased mounting area between the first frame rail 706 and the second frame rail 708 can accommodate more and/or larger batteries to increase a storage capacity of a vehicle (e.g., the vehicle 10). In some embodiments, the batteries mounted between the first frame rail 706 and the second frame rail 708 may be used to power one or more electric motors. For example, at least one of the axles 704 can include an electric motor and be configured as an electronic axle. In some embodiments, the front axle 714 is configured as an electronic axle. In some embodiments, the rear axle 716 is configured as an electronic axle. In some embodiments, both the front axle 714 and the rear axle 716 are configured as electronic axles.

Figure 13:
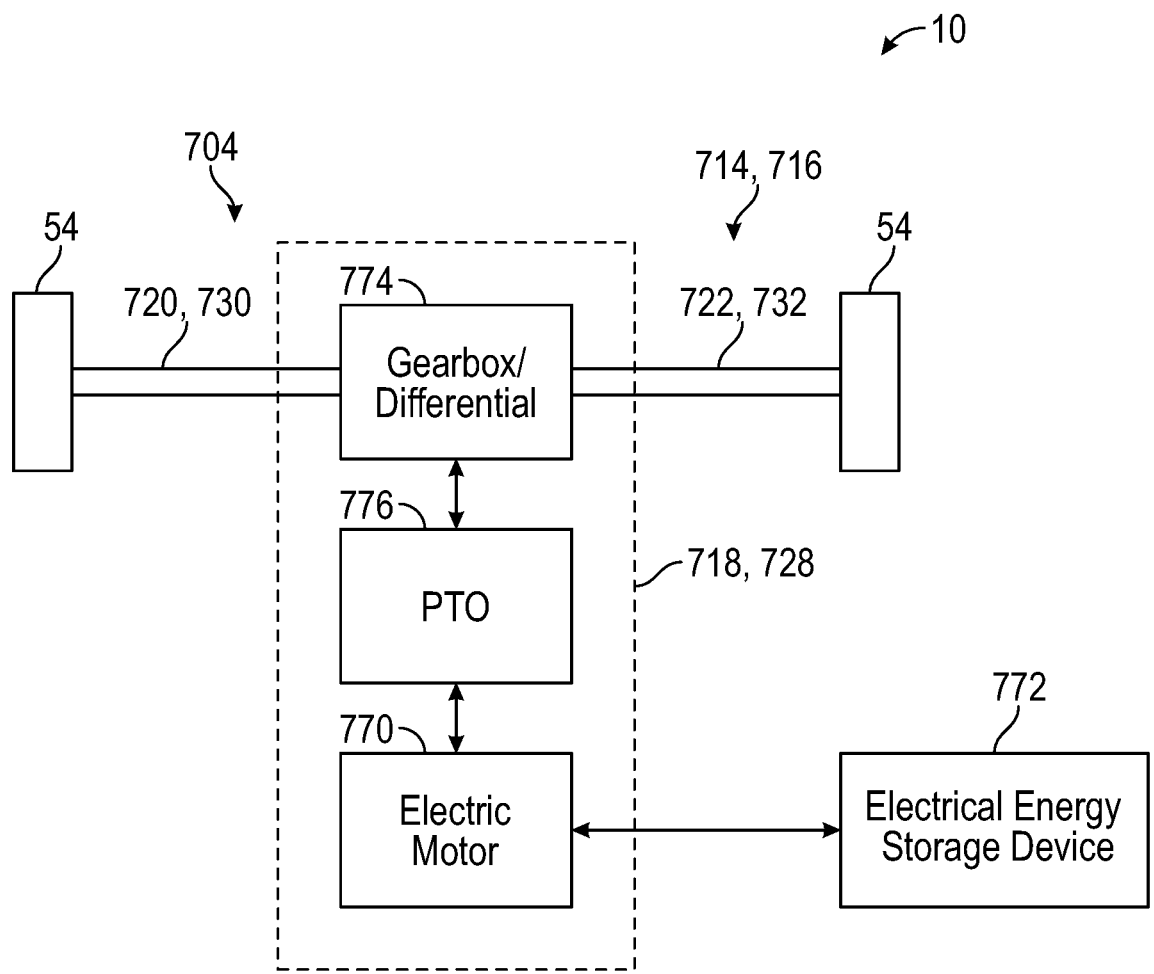
FIG. 13 is a schematic diagram of an axle of the suspension of FIG. 9, according to an exemplary embodiment.

As shown in FIG. 13, the axles 704 (e.g., the front axle 714 and/or the rear axle 716) may include an electric motor 770 (e.g., a motor/generator, an electromagnetic device, etc.) that is configured to consume electrical energy from an electrical energy storage device 772 (e.g., the batteries 60, or other battery cells or packs) and generate (e.g., provide) mechanical power (e.g., rotational mechanical energy) using the electrical energy. In some embodiments, the axles 704 may include multiple electric motors 770 (e.g., two or more). Accordingly, any embodiment described herein as including a single electric motor may include multiple electric motors operating cooperatively (e.g., multiple electric motors with output shafts coupled to one another).

In some embodiments, the front axle 714 may be an electric axle, and may include the electric motor 770 that drives the wheels 54 of the front axle 714 to propel the vehicle 10. In some embodiments, the rear axle 716 may include the electric motor 770 (e.g., in addition to or in replace of the electric motor 770 of the front axle 714) to drive the wheels 54 of the rear axle 716 and to propel the vehicle 10. In some embodiments, the electric motor(s) 770 are configured to perform regenerative braking by receiving rotational mechanical energy from the wheels 54 and providing electrical energy (e.g., to the electrical energy storage device 772).

In some embodiments, the axles 704 includes the electric motor 770 and a gearbox/differential 774. The electric motor 770 may drive an output driveshaft (e.g., an output shaft) that is received at an opposite end by the gearbox/differential 774. The gearbox/differential 774 can be or include a reduction gearbox (e.g., a gear set that receives input mechanical energy at a first speed and outputs mechanical energy at a second, lower, speed and an increased torque) or may be or include a gearbox that receives input mechanical energy at a first speed and outputs mechanical energy at a second, higher, speed and a decreased torque. In some embodiments, the gearbox/differential 774 is or includes a differential that is configured to receive rotational kinetic energy or mechanical energy (e.g., through the output driveshaft) about an axis in a first direction, and output rotational kinetic energy or mechanical energy (e.g., through axles 704) about an axis (e.g., the first axle axis 724 and/or the second axle axis 734) that extends in a different direction.

In some embodiments, the axles 704 include a power take off (PTO) 776 that may be configured to selectively engage the output driveshaft by transitioning between an engaged state and a disengaged state. In some embodiments, the PTO 776 is electrically activated and transitions into the engaged state in response to receiving a control signal from a controller. In some embodiments, the PTO 776 can include a clutch (e.g., an electrically activated clutch) that is configured to engage the output driveshaft to selectively couple PTO 776 with the output driveshaft. When the PTO 776 engages the output driveshaft, the PTO 776 transfers mechanical energy to an accessory of the vehicle 10. The mechanical energy is transferred to the accessory through the PTO 776 to drive the accessory so that the accessory can perform its respective functions. For example, the accessory may be or include a hydraulic system including a hydraulic pump. The mechanical energy generated by the electric motor 770 can be transferred through the PTO 776 to the hydraulic pump to pressurize the hydraulic system.

In some embodiments, the axles 704 are self-contained axle assemblies. For example, the axle housings (e.g., the axle housing 718 and/or the axle housing 728) house and support the components of the axles. In some embodiments, the axle housings (e.g., the axle housing 718 and/or the axle housing 728) may at least partially (e.g., partially, completely) enclose the electric motor 770, the gearbox/differential 774, and the PTO 776. In some embodiments, the electric motor 770 and/or the PTO 776 may be arranged externally from the axle housings (e.g., the axle housing 718 and/or the axle housing 728).

In configurations where the axles 704 are electrified, the design and properties of the suspension assembly 700 efficiently accommodates the electrical energy storage device(s) 772 by providing a large mounting area between the first frame rail 706 and the second frame rail 708.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the suspension assembly 700 as shown in the various exemplary embodiments is illustrative only. Additionally, any element disclosed in one embodiment may be incorporated or utilized with any other embodiment disclosed herein. For example, the suspension assembly 700 and the chassis 702 of the exemplary embodiment shown in at least FIGS. 8-12 may be incorporated in the chassis 20 of the exemplary embodiment shown in at least FIGS. 1-7, and/or the axles 704 of the exemplary embodiment shown in FIGS. 8-13 may be incorporated in the axles assemblies 50, 52 of the exemplary embodiment shown in FIGS. 1-7. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A suspension assembly for an electrified vehicle, the electrified vehicle including a chassis and an axle assembly, the chassis having a first frame rail and a second frame rail laterally separated from the first frame rail, the axle assembly including an axle housing arranged laterally between the first frame rail and the second frame rail, the suspension assembly comprising:
   a first linkage rod coupled between the axle housing and the first frame rail, wherein the first linkage rod is arranged at an angle relative to a central longitudinal axis so that as the first linkage rod extends from the axle housing toward the first frame rail, the first linkage rod angles laterally outwardly and away from the central longitudinal axis, wherein the first linkage rod is coupled to the axle housing at a first location that is laterally outward from the central longitudinal axis and closer to the first frame rail than the central longitudinal axis; and
   a second linkage rod coupled between the axle housing and the second frame rail, wherein the second linkage rod is arranged at an angle relative to the central longitudinal axis so that as the second linkage rod extends from the axle housing toward the second frame rail, the second linkage rod angles laterally outwardly and away from the central longitudinal axis, wherein the second linkage rod is coupled to the axle housing at a second location that is laterally outward from the central longitudinal axis and closer to the second frame rail than the central longitudinal axis.

2. The suspension assembly of claim 1, wherein the first linkage rod and the second linkage rod are arranged symmetrically about the central longitudinal axis.

3. The suspension assembly of claim 1, wherein the first linkage rod is coupled to the first frame rail by a first bracket, and wherein the second linkage rod is coupled to the second frame rail by a second bracket.

4. The suspension assembly of claim 3, wherein the first linkage rod angles downwardly in a direction away from the first frame rail as the first linkage rod extends from the axle housing to the first bracket.

5. The suspension assembly of claim 3, wherein the second linkage rod angles downwardly in a direction away from the second frame rail as the second linkage rod extends from the axle housing to the second bracket.

6. The suspension assembly of claim 1, further comprising a spring beam coupled to a half-shaft assembly of the axle assembly.

7. The suspension assembly of claim 6, further comprising a damping cylinder coupled between the spring beam and the first frame rail.

8. The suspension assembly of claim 1, wherein the first linkage rod and the second linkage rod form a first pair of linkage rods, and a second pair of linkage rods are arranged symmetric to the first pair of linkage rods about a central lateral axis.

9. An electrified vehicle comprising:
   a chassis including a first frame rail and a second frame rail laterally separated from the first frame rail;

an axle assembly including an axle housing arranged laterally between the first frame rail and the second frame rail;
an energy storage system supported on the chassis;
a suspension assembly comprising:
  a first linkage rod coupled between the axle housing and the first frame rail, wherein the first linkage rod is arranged at an angle relative to a central longitudinal axis so that as the first linkage rod extends from the axle housing toward the first frame rail, the first linkage rod angles laterally outwardly and away from the central longitudinal axis, wherein the first linkage rod is coupled to the axle housing at a first location that is laterally outward from the central longitudinal axis and closer to the first frame rail than the central longitudinal axis; and
  a second linkage rod coupled between the axle housing and the second frame rail, wherein the second linkage rod is arranged at an angle relative to the central longitudinal axis so that as the second linkage rod extends from the axle housing toward the second frame rail, the second linkage rod angles laterally outwardly and away from the central longitudinal axis, wherein the second linkage rod is coupled to the axle housing at a second location that is laterally outward from the central longitudinal axis and closer to the second frame rail than the central longitudinal axis.

10. The electrified vehicle of claim 9, wherein the first linkage rod and the second linkage rod are arranged symmetrically about the central longitudinal axis.

11. The electrified vehicle of claim 9, wherein the first linkage rod is coupled to the first frame rail by a first bracket, and wherein the second linkage rod is coupled to the second frame rail by a second bracket.

12. The electrified vehicle of claim 11, wherein the first linkage rod angles downwardly in a direction away from the first frame rail as the first linkage rod extends from the axle housing to the first bracket.

13. The electrified vehicle of claim 11, wherein the second linkage rod angles downwardly in a direction away from the second frame rail as the second linkage rod extends from the axle housing to the second bracket.

14. The electrified vehicle of claim 9, further comprising a spring beam coupled to a half-shaft assembly of the axle assembly.

15. The electrified vehicle of claim 14, further comprising a damping cylinder coupled between the spring beam and the first frame rail.

16. The electrified vehicle of claim 9, wherein the first linkage rod and the second linkage rod form a first pair of linkage rods, and a second pair of linkage rods are arranged symmetric to the first pair of linkage rods about a central lateral axis.

17. An electrified vehicle comprising:
a chassis including a first frame rail and a second frame rail laterally separated from the first frame rail;
a first axle assembly including a first axle housing arranged laterally between the first frame rail and the second frame rail;
a second axle assembly including a second axle housing arranged on an opposing side of a central lateral axis from the first axle housing;
an energy storage system supported on the chassis between the first frame rail and the second frame rail;
a suspension assembly comprising:
  a first linkage rod coupled between the first axle housing and the first frame rail, wherein the first linkage rod is arranged at an angle relative to a central longitudinal axis so that as the first linkage rod extends from the first axle housing toward the first frame rail, the first linkage rod angles laterally outwardly and away from the central longitudinal axis, wherein the first linkage rod is coupled to the first axle housing at a first location that is laterally outward from the central longitudinal axis and closer to the first frame rail than the central longitudinal axis; and
  a second linkage rod coupled between the second axle housing and the first frame rail, wherein the second linkage rod is arranged at an angle relative to the central longitudinal axis so that as the second linkage rod extends from the second axle housing toward the first frame rail, the second linkage rod angles laterally outwardly and away from the central longitudinal axis, wherein the second linkage rod is coupled to the second axle housing at a second location that is laterally outward from the central longitudinal axis and closer to the first frame rail than the central longitudinal axis.

18. The electrified vehicle of claim 17, wherein the first linkage rod and the second linkage rod form a first pair of linkage rods, and a second pair of linkage rods are arranged symmetric to the first pair of linkage rods about the central longitudinal axis.

19. The electrified vehicle of claim 17, wherein the first linkage rod angles downwardly in a direction away from the first frame rail as the first linkage rod extends from the first axle housing toward a first bracket, the first bracket being coupled between the first linkage rod and the first frame rail.

20. The electrified vehicle of claim 19, wherein the second linkage rod angles downwardly in a direction away from the first frame rail as the second linkage rod extends from the second axle housing toward the first bracket.

* * * * *